United States Patent
Nguyen et al.

(10) Patent No.: US 6,645,287 B2
(45) Date of Patent: Nov. 11, 2003

(54) COATING COMPOSITIONS COMPRISING HIGH T-AREA CARBON PRODUCTS

(75) Inventors: Lang H. Nguyen, Lowell, MA (US); Thomas E. McElwain, Pampa, TX (US); Samuel N. Shields, Jr., Pampa, TX (US); John F. Nagel, Champaign, IL (US); David D. Smith, Pampa, TX (US); Jameel Menashi, Lexington, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/844,940

(22) Filed: Apr. 27, 2001

(65) Prior Publication Data
US 2002/0189498 A1 Dec. 19, 2002

(51) Int. Cl.[7] ............... C09C 1/44; C01B 31/32; C01D 3/00
(52) U.S. Cl. ......... 106/473; 106/472; 106/476; 106/478; 423/442.6; 423/449.1
(58) Field of Search ............... 106/472, 473, 106/476, 478; 423/449.1, 442.6

(56) References Cited

U.S. PATENT DOCUMENTS

| | | | |
|---|---|---|---|
| 3,922,335 A | 11/1975 | Jordan et al. ............... 423/450 |
| 4,366,138 A | * 12/1982 | Eisenmenger et al. ...... 423/445 |
| 5,281,261 A | * 1/1994 | Lin ........................... 106/20 R |
| 5,393,821 A | 2/1995 | Shieh et al. ................. 524/495 |
| 5,456,750 A | 10/1995 | Mackay et al. ............. 106/476 |
| 5,554,739 A | 9/1996 | Belmont ..................... 534/885 |
| 5,571,311 A | * 11/1996 | Belmone et al. .......... 106/20 R |
| 5,672,198 A | 9/1997 | Belmont ..................... 106/20 |
| 5,698,016 A | 12/1997 | Adams et al. ............... 106/316 |
| 5,707,432 A | 1/1998 | Adams et al. ............... 106/31.6 |
| 5,713,988 A | 2/1998 | Belmont et al. ............ 106/31.6 |
| 5,747,562 A | 5/1998 | Mahmud et al. ............ 523/215 |
| 5,749,950 A | 5/1998 | Mahmud et al. ............ 106/31.6 |
| 5,803,959 A | 9/1998 | Johnson et al. ............ 106/31.75 |
| 5,830,930 A | 11/1998 | Mahmud et al. ............ 523/215 |
| 5,837,045 A | 11/1998 | Johnson et al. ............ 106/31.85 |
| 5,851,280 A | 12/1998 | Belmont et al. ............ 106/472 |
| 5,885,335 A | 3/1999 | Adams et al. ............... 106/316 |
| 5,895,522 A | 4/1999 | Belmont et al. ............ 106/31.6 |
| 5,922,118 A | 7/1999 | Johnson et al. ............ 106/31.6 |
| 5,968,243 A | 10/1999 | Belmont et al. ............ 106/31.65 |
| 6,042,643 A | 3/2000 | Belmont et al. ............ 106/472 |
| 6,068,688 A | 5/2000 | Whitehouse et al. ....... 106/31.65 |
| 6,123,759 A | * 9/2000 | Mise et al. ................ 106/31.9 |
| 6,169,129 B1 | 1/2001 | Mahmud et al. ............ 523/215 |
| 6,336,965 B1 | * 1/2002 | Johnson et al. ............ 106/31.6 |

FOREIGN PATENT DOCUMENTS

| | | | |
|---|---|---|---|
| EP | 0 896 986 A1 | 2/1999 | ......... C09C/1/48 |
| WO | WO99/23174 | 5/1999 | ......... C09C/1/56 |
| WO | WO99/63007 | 12/1999 | ......... C09C/1/56 |
| WO | WO00/52102 | 9/2000 | ......... C09B/67/00 |
| WO | WO00/63306 | 10/2000 | ......... C09D/11/00 |

OTHER PUBLICATIONS

International Search Report for PCT/US02/12812, mailed Aug. 5, 2002.

"Raven Blacks," Columbian Chemicals Company, 10/99.

(List continued on next page.)

*Primary Examiner*—Mark L. Bell
*Assistant Examiner*—Patricia L. Hailey

(57) ABSTRACT

The present invention discloses coating compositions comprising a liquid vehicle and a carbon product having a t-area greater than or equal to 400 $m^2/g$. In addition, the present invention discloses coating compositions comprising a liquid vehicle and a modified carbon product having a t-area greater than or equal to 350 $m^2/g$, wherein the modified carbon product comprises a carbon product having attached at least one organic group.

23 Claims, 1 Drawing Sheet

OTHER PUBLICATIONS

"Typical Properties of Industrial Carbon Blacks," Columbian Chemicals Company, 4/96.

"Typical Properties of Performance Carbon Blacks," Columbian Chemicals Company, 10/91.

"Coloristic Measurements of Jet–Black and Grey Coatings," Technical Bulletin Pigments, no month available, No. 37, Degussa AG, revised version of publications which appeared in farbe + lack, 87, 88, 1981 (for part 10), and XVIII, Fatipec Congress Book vol. 2/B, p. 465, 1986 (for Part 16).

"Carbon Blacks for Coatings—Typical Technical Properties and Applications," Degussa–Hüls Corporation, (undated).

"Raven 5000 Ultra III," Columbian Chemicals Company, (undated).

"Pigment Blacks for Printing Inks, Coatings, and Plastics," Degussa, (undated).

"Cabot Carbon Blacks for Specialty Applications," North American Technical Report S–136, Cabot Corporation Special Blacks Division, (undated).

ASTM D–1765, Table 1, Carbon Black Properties, (undated).

* cited by examiner

US 6,645,287 B2

COATING COMPOSITIONS COMPRISING HIGH T-AREA CARBON PRODUCTS

BACKGROUND OF THE INVENTION

1. Field of the Invention

The present invention relates to coating compositions comprising a liquid vehicle and a carbon product having a t-area greater than or equal to 400 m$^2$/g. The present invention further relates to coating compositions comprising a liquid vehicle and a modified carbon product having a t-area greater than or equal to 350 m$^2$/g.

2. Description of the Related Art

Coating compositions are used for decorative, protective, and functional treatments of many kinds of surfaces. These surfaces include coils, metals, appliances, furniture, hardboard, lumber and plywood, marine, automobile, cans, and paperboard. Some coatings, such as those on undersea pipelines, are for protective purposes. Others, such as exterior automobile coatings, fulfill both decorative and protective functions. Still others provide friction control on boat decks or car seats. Some coatings control the fouling of ship bottoms, others protect food and beverages in cans. Silicon chips, printed circuit panels, coatings on waveguide fibers for signal transmission, and magnetic coatings on video tapes and computer disks are among many so-called hi-tech applications for coatings.

Surface coating compositions are generally more or less viscous liquids with three base components: a film-forming substance or combination of substances called the binder, a pigment or combination of pigments, and a volatile liquid. The combination of binder and volatile liquid is called the vehicle. Vehicles may be in a solution form or as a dispersion of fine binder particles in a non-solvent. Pigments are finely divided, insoluble, solid particles dispersed in the coating vehicle and are distributed throughout the binder in the final film. Surfactants may also be added and are typically used as pigment dispersants. The components and manufacturing of coating compositions such as aqueous coatings are further discussed in the Concised Encyclopedia of Polymers, Science and Engineering, pages. 160–171 (1990), which is incorporated herein by reference.

Pigments in coating compositions provide opacity and color. The amount and type of pigment controls such properties as the gloss of the final film and can have important effects on its mechanical properties. Some pigments even inhibit corrosion. Further, pigments affect the viscosity and enhance the application properties of the coating. Carbon products and, in particular, carbon black, are common pigments used in coating applications.

An important variable determining the performance of carbon products in coating compositions is surface area. It is well known in the art that the higher the surface area of a carbon product in a coating composition, the better the color properties of the resulting coating (see, for example, the Cabot Corporation Technical Report S-140 entitled "Black Pearls® 1400, Monarch® 1400: Superior High Color Carbon Blacks"). Surface area, which is inversely related to the size of the particles, is known to effect such properties as gloss, jetness, and bluetone.

There are several different measures of the surface area. One common technique is to measure the amount of a probe material that is capable of being absorbed onto the carbon surface. Typical probes molecules are nitrogen (known as the BET method), iodine, and cetyltrimethylammonium bromide (CTAB).

Different probe molecules result in different surface area values and can reflect different aspects of the carbon surface. For example, CTAB and iodine surface areas are dependent on the chemistry of the carbon surface. Two carbon blacks with the same particle size can have very different CTAB and iodine values if their surface chemistries are different. Also, BET surface area is dependent on the porosity of the pigment. Carbon surfaces generally contain pores. The total surface area of a pigment (which is measured by the BET method) is therefore the sum of its internal surface area (from pores) and its external surface. Thus, two pigments may also have the same particle size yet may have very different BET surface areas due to their porosity. The t-area (also known as the statistical thickness surface area, or STSA) is a measure of only the external surface area of a carbon product and is calculated by subtracting the porosity value from the BET value. As a result, the t-area of a carbon product is always less than the BET value.

As stated above, a goal for the coating supplier is to provide a coating with the best overall color properties. In general, smaller particle pigments are desired in order to obtain these results. However, smaller particle size (higher surface area) pigments also results in an increase in the viscosity of the coating composition. Also, and perhaps more importantly, the particle size and surface area of the pigment effects its dispersibility into the coating composition. In manufacturing coatings, it is desirable to disperse the pigment in such a way as to achieve a stable dispersion where most, if not all, of the pigment particles are separated into the individual particles. The mechanism of dispersion of a pigment involves wetting, separation, and stabilization. It is known that the higher the surface area of a pigment, the more difficult that pigment is to wet and therefore disperse in the vehicle used for the coating composition. A poor pigment dispersion leads to a deterioration of coating properties. Dispersion stability may also suffer. High surface area pigments often require high energy processes (such as milling) to obtain stable dispersions and therefore good color performance. For these reasons, commercially available pigments for high color coating applications are designed to afford the best compromise of surface area and dispersion quality and stability.

One method to prepare coating compositions with improved properties is described in U.S. Pat. Nos. 5,672,198 and 5,713,988, both incorporated in their entireties herein by reference, which disclose aqueous and non-aqueous inks and coatings containing modified carbon products having attached organic groups. While the foregoing compositions have yielded good coatings, a need remains for improved compositions with high color performance and good overall application and mechanical properties.

SUMMARY OF THE INVENTION

Figure 1:
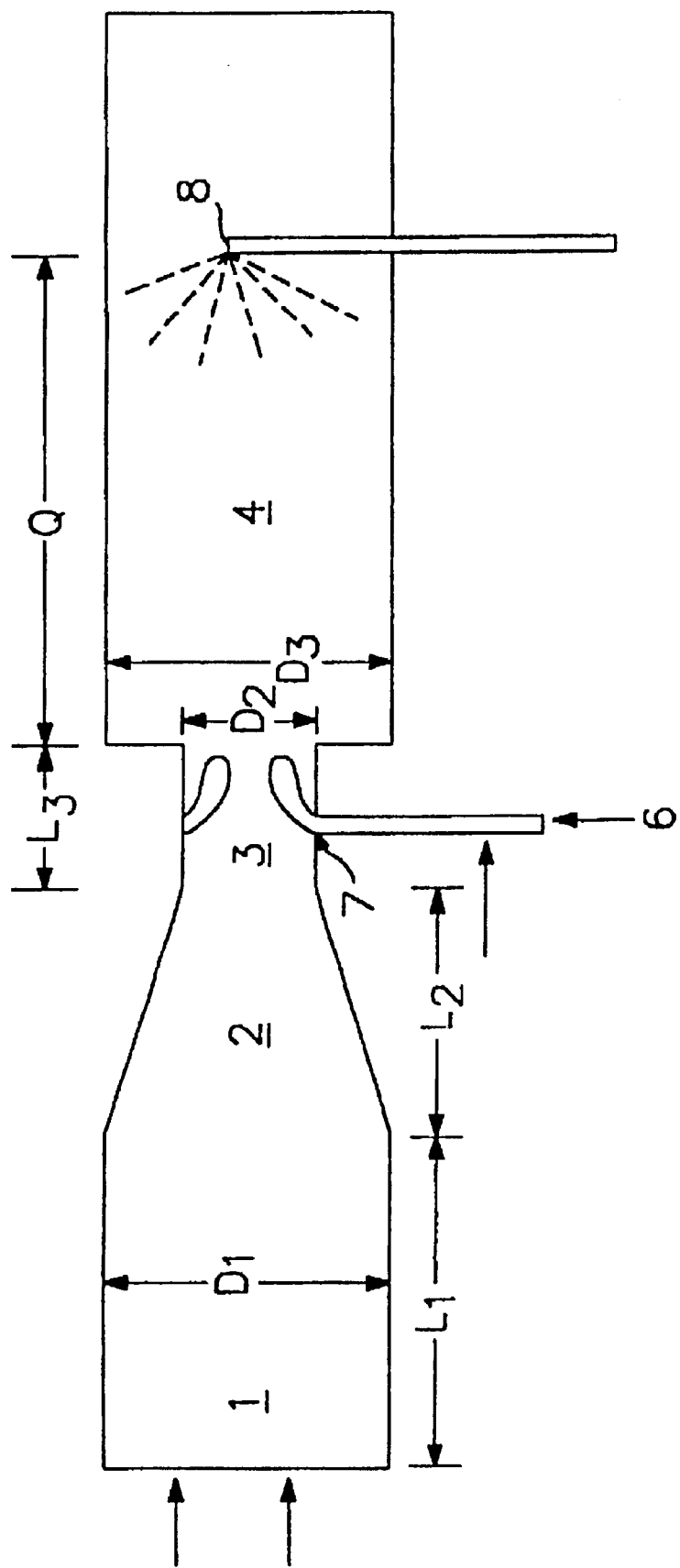
FIG. 1 is a schematic view of a portion of one type of reactor which may be used to produce the high t-area carbon products useful in the coating compositions of the present invention.

The present invention relates to coating compositions comprising a liquid vehicle and a carbon product having a t-area greater than or equal to 400 m$^2$/g. The liquid vehicle may be an aqueous or a non-aqueous vehicle.

The present invention further relates to coating compositions comprising a liquid vehicle and a modified carbon product having a t-area greater than or equal to 350 m$^2$/g, wherein the modified carbon product comprises a carbon product having attached at least one organic group. The liquid vehicle may be an aqueous or a non-aqueous liquid vehicle.

It is to be understood that both the foregoing general description and the following detailed description are exemplary and explanatory only and are intended to provide further explanation of the present invention, as claimed.

DETAILED DESCRIPTION OF THE INVENTION

The present invention relates to coating compositions comprising a liquid vehicle and a carbon product having a specified t-area In general, as discussed above, a coating composition comprises a pigment dispersed in a solvent and a binder or resin (the vehicle). The vehicle for the coating compositions of the present invention can be either an aqueous vehicle or a non-aqueous vehicle. Thus, the resulting compositions can be either an aqueous coating composition or a non-aqueous coating composition.

The composition of the vehicle can vary depending on the conditions and requirements for the final coating. For example, the resin content can vary between about 70–100%. Examples of resins or binders useful for both the aqueous and non-aqueous coating compositions of the present invention include, but are not limited to, acrylic, alkyd, urethane, epoxy, and cellulosic resins. Solvent content may vary between nearly 0% and 80%. Examples of non-aqueous solvents include aromatic hydrocarbons, aliphatic hydrocarbons, alcohols, polyalcohols, ketones, esters, and the like.

The vehicle may also contain optional additives which can be used to improve such properties as viscosity, leveling, and dry time. Examples include cosolvents (in particular, water soluble solvents for aqueous coatings), surfactants, and fillers such as clays, talcs, silicas, and carbonates. Additionally, flow modifiers, leveling aids, and biocides can be added.

In one embodiment, the coating compositions of the present invention comprise carbon products having a t-area greater than or equal to 400 $m^2/g$. As discussed above, the t-area (also known as statistical thickness surface area, or STSA) is the external surface area of the carbon product as measured using nitrogen as the probe material. Thus, the t-area is the BET surface area minus the porosity. Preferably, the carbon products of the coating compositions of the present invention have a t-area between 400 and 600 $m^2/g$ and more preferably the t-area is between 400 and 500 $m^2/g$.

While any carbon product with a t-area greater than or equal to 400 $m^2/g$ can be used in the coating compositions of the present invention, preferred are those which further have defined DBPA (dibutyl phthalate absorption) values. DBPA is a measure of the structure or branching of the carbon product. The greater the structure, in general, the better the dispersibility of the carbon product. However, the greater the structure, the higher the viscosity of the coating composition. Also, higher structure generally results in poorer color performance—lower gloss and jetness. Thus, preferred carbon products for use in the coating compositions of the present invention have DBPA values between 60 and 150 cc/100 g. Most preferred are those that further have a DBPA value between 80 and 120 cc/100 g.

Examples of suitable carbon products include, but are not limited to, graphite, carbon black, vitreous carbon, carbon fibers, activated charcoal, and activated carbon. The carbon may be of the crystalline or amorphous type. Finely divided forms of the above are preferred; also, it is possible to utilize mixtures of different carbons. Of these carbon products, carbon black is preferred.

The carbon blacks useful for the coating compositions of the present invention may be produced in furnace type reactors known to those skilled in the art and are preferably produced in a furnace reactor as depicted in FIG. 1. The furnace reactor has a combustion zone 1 of length L1 and diameter D1 with a zone of converging diameter 2 of length L2, a feedstock injection zone 3 of length L3 with restricted diameter D2, and a reaction zone 4 with diameter D3.

To produce carbon blacks with the reactor described above, hot combustion gases are generated in combustion zone 1 by contacting a liquid or gaseous fuel with a suitable oxidant stream such as air, oxygen, or mixtures of air and oxygen. Among the fuels suitable for use in contacting the oxidant stream in combustion zone 1, to generate the hot combustion gases, are included any readily combustible gas, vapor or liquid streams such as natural gas, hydrogen, methane, acetylene, alcohols, or kerosene. It is generally preferred, however, to use fuels having a high content of carbon-containing components and in particular, hydrocarbons. The ratio of air to fuel varies with the type of fuel utilized. When natural gas is used to produce the carbon blacks of the present invention, the ratio of air to fuel may be from about 10:1 to about 1000:1. To facilitate the generation of hot combustion gases, the oxidant stream may be pre-heated.

The hot combustion gas stream flows downstream from zones 1 and 2 into zones 3 and 4. The direction of the flow of hot combustion gases is shown in FIG. 1 by the arrows. Carbon black feedstock, 6, is introduced at point 7 into the feedstock injection zone 3. The feedstock is injected into the gas stream through nozzles or orifices designed for optimal distribution of the oil in the gas stream. Such nozzles may be either single or bi-fluid. Bi-fluid nozzles may use steam or air to atomize the fuel. Single-fluid nozzles may be pressure atomized or the feedstock can be directly injected into the gas-stream. In the latter instance, atomization occurs by the force of the gas-stream.

Carbon blacks can be produced by the pyrolysis or partial combustion of any liquid or gaseous hydrocarbon. Preferred carbon black feedstocks include petroleum refinery sources such as decanted oils from catalytic cracking operations, as well as the by-products from coking operations and olefin manufacturing operations. Most preferred are feedstocks with low sulfur content which tend to yield carbon blacks with improved purity and enhanced jetness in the coating compositions.

The mixture of carbon black-yielding feedstock and hot combustion gases flows downstream through zone 3 and 4. In the reaction zone portion of the reactor, the feedstock is pyrolyzed to carbon black. The reaction is arrested in the quench zone of the reactor. Quench 8 is located downstream of the reaction zone and sprays a quenching fluid, generally water, into the stream of newly formed carbon black particles. The quench serves to cool the carbon black particles and to reduce the temperature of the gaseous stream and decrease the reaction rate. Q is the distance from the beginning of reaction zone 4 to quench point 8, and will vary according to the position of the quench. Optionally, quenching may be staged, or take place at several points in the reactor.

After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art. After the carbon black has been separated from the gas stream, it is optionally subjected to a pelletization step.

The carbon blacks of the present invention may further be produced using the apparatus and procedure described in U.S. Pat. No. 3,922,335, which is fully incorporated herein by reference.

Most preferred carbon blacks are carbon blacks that have been oxidized in order to increase the amount of oxygen functionality on the surface. Oxidized carbon blacks are well known in the art and are typically prepared by the reaction of an oxidant, such as nitric acid or ozone, with a base carbon black. The increase in functionality on the surface typically gives rise to a decrease in pH. Thus, oxidized carbon blacks are typically acidic.

In a second embodiment, the coating compositions of the present invention comprise modified carbon products having a t-area greater than or equal to 350 $m^2/g$, wherein the modified carbon product comprises a carbon product having attached at least one organic group. Preferably, the modified carbon products have a t-area between 350 and 600 $m^2/g$ and more preferably the t-area is between 350 and 500 $m^2/g$. While any modified carbon product with a t-area greater than or equal to 350 $m^2/g$ can be used in the coating compositions of the present invention, preferred are those which further have DBPA values between 60 and 150 cc/100 g. Most preferred are those that further have a DBPA value between 80 and 120 cc/100 g.

The modified carbon products are prepared using methods known to those skilled in the art such that chemical groups (e.g., polymeric and organic) are attached to the pigment, such groups providing a more stable attachment of the groups onto the pigment compared to adsorbed groups, e.g., polymers, surfactants, and the like. For example, the modified carbon products of the present invention can be prepared using the methods described in U.S. Pat. Nos. 5,554,739, 5,851,280, 6,042,643, 5,707,432, and 5,837,045, and PCT Publication WO 99/23174, the descriptions of which are fully incorporated herein by reference.

The modified carbon products can be prepared from any of the carbon products described above. Preferably, the carbon product is either carbon black or an oxidized carbon black.

The attached organic group is chosen depending on the type of resin or binder used in the vehicle of the coating composition as well as the substrate to which the coating is to be applied. This allows for greater flexibility by tailoring the carbon product to the specific coating application.

In one embodiment, the organic group comprises an ionic group, an ionizable group, or a mixture of an ionic group and an ionizable group. An ionic group is either anionic or cationic and is associated with a counterion of the opposite charge including inorganic or organic counterions such as $Na^+$, $K^+$, $Li^+$, $NH_4^+$, $NR'_4{}^+$ acetate, $NO_3{}^-$, $SO_4{}^{-2}$, $OH^-$, and $Cl^-$, where R' represents hydrogen or an organic group such as a substituted or unsubstituted aryl and/or alkyl group. An ionizable group is one that is capable of forming an ionic group in the medium of use. Thus, in a preferred embodiment, the organic group is an organic ionic group. Organic ionic groups include those described in U.S. Pat. No. 5,698,016, the description of which is fully incorporated herein by reference.

Negatively charged organic ionic groups may be generated from groups having ionizable substituents that can form anions, such as acidic substituents, or may be the anion in the salts of ionizable substituents. Preferably, when the ionizable substituent forms an anion, the ionizable substituent has a pKa of less than 11. The organic ionic group could further be generated from a species having ionizable groups with a pKa of less than 11 and salts of ionizable substituents having a pKa of less than 11. The pKa of the ionizable substituent refers to the pKa of the ionizable substituent as a whole, not just the acidic substituent. More preferably, the pKa is less than 10 and most preferably less than 9.

Representative examples of ionic groups include —$COO^-$, —$SO_3{}^-$, —$HPO_3-$, and —$PO_3{}^{-2}$. Representative examples of ionizable groups include —COOH, —$SO_3H$, —$PO_3H_2$, —$SO_2NH_2$, and —$SO_2NHCOR'$, where R' represents hydrogen or an organic group such as a substituted or unsubstituted aryl and/or alkyl group. Particularly preferred species are —$COO^-$ and —$SO_3{}^-$. Preferably, the organic ionic group is generated from a substituted or unsubstituted carboxyphenyl group or a substituted or unsubstituted sulfophenyl group. Specific organic ionic groups are —$C_6H_4CO_2{}^-$ and —$C_6H_4SO_3{}^-$.

Positively charged organic ionic groups may be generated from protonated amines which are attached to the carbon product. Preferably, an organic group having an amine substituent has a pKb of less than 5. Positively charged organic ionic group may be quaternary ammonium groups (—$NR'_3{}^+$) and quaternary phosphonium groups (—$PR'_3{}^+$), where R' represents hydrogen or an organic group such as a substituted or unsubstituted aryl and/or alkyl group. For example, amines may be protonated to form ammonium groups in acidic media. Quaternized cyclic ammonium ions, and quaternized aromatic ammonium ions, can also be used as the organic ionic group. Thus, N-substituted pyridinium species, such as N-methyl-pyridyl, can be used in this regard. Examples of cationic organic groups include, but are not limited to, -3-$C_5H_4N(C_2H_5)^+$, -3-$C_5H_4N(CH_3)^+$, -3-$C_5H_4N(CH_2C_6H_5)^{30}$, —$C_6H_4(NC_5H_5{}^{30})$, —$C_6H_4COCH_2N(CH_3)_3{}^+$, —$C_6H_4COCH_2(NC_5H_5)^+$, —$C_6H_4SO_2NH(C_4H_3N_2H^+)$, —$C_6H_4CH_2N(CH_3)_3{}^+$, —$C_6H_4NH_3{}^+$, —$C_6H_4NH_2(CH_3)^+$, —$C_6H_4Nh(CH_3)_2{}^+$, —$C_6H_4N(CH_3)_3{}^+$, —$C_6H_4CH_2NH_3{}^+$, —$C_6H_4CH_2NH_2(CH_3)^+$, —$C_6H_4CH_2NH(CH_3)_2{}^+$, —$C_6H_4CH_2N(CH_3)_3{}^+$, —$C_6H_4CH_2CH_2NH_3{}^+$, —$C_6H_4CH_2CH_2NH_2(CH_3)^+$, —$C_6H_4CH_2CH_2NH(CH_3)_2{}^+$ and —$C_6H_4CH_2CH_2N(CH_3)_3{}^+$. Other substituted or unsubstituted arylene or heteroarylene groups can be used in the place of the $C_6H_4$ groups shown in the structures above. Preferably, the cationic organic group is —$NR'_3{}^+$ wherein R' is an alkyl group or an aryl group. Another preferred group is —$C_5H_4N$—$R'^+$, wherein R' is an alkyl group such as a methyl group or a benzyl group.

Attached groups comprising ionic or ionizable groups are most preferred for aqueous coating compositions. Under these conditions, the attached groups can provide increased stability of the carbon product in the vehicle. For non-aqueous vehicles, a more organic-type attached group may be preferred. However, as described above, the choice of attached group is not only dependent on the solvent but is also dependent on the resin or binder as well as the substrate to which the coating composition is to be applied. Thus, modified carbon products having attached ionic or ionizable groups may also be useful in non-aqueous coatings applications. Further, it is also within the scope of the present invention to have more than one type of attached group on the carbon product in order to provide for the best overall performance.

The amount of attached organic groups on the modified carbon products is chosen in order to obtain the desired dispersibility of the carbon products in the coating compositions of the present invention. In general, the amount of attached organic groups is from about 0.001 to about 10.0 micromoles of organic group per $m^2$ surface area of pigment (surface area as measured by nitrogen adsorption, and, in particular, the t-area method). Preferably, the amount of attached organic groups is between from about 0.1 to about 5.0 micromoles per $m^2$, and most preferably the amount of attached organic groups is between from about 0.1 to about 2.7 micromoles per $m^2$. The amount attached can be varied depending on the specific attached group and can be adjusted depending on, for example, the size of the attached group or the functionality of the ionic group.

The modified carbon products may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. Dispersions of the modified carbon products may be further purified or classified to remove impurities and other undesirable free species which can co-exist in the dispersion as a result of the manufacturing process. For example, a dispersion of the modified carbon product can be subjected to a classification step, such as centrifugation, to substantially remove particles having a size above about 1.0 micron. In addition, the dispersion can be purified to remove any undesired free species, such as unreacted treating agent. Known techniques of ultrafiltration/diafiltration using a membrane or ion exchange may be used to purify the dispersion and remove a substantial amount of free ionic and unwanted species. Also, an optional exchange of counterions whereby the counterions that form a part of the modified carbon products can be exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, and $Br^-$. The removal of impurities from the modified carbon products may also improve the properties of the coatings produced using the coating compositions of the present invention.

The coating compositions of the present invention can be prepared using any technique known to those skilled in the art. Thus, for example, the carbon product can be combined with a liquid vehicle and other coating components in a high speed mixer and/or mill. The amount of carbon product used in the coating compositions of the present invention is dependent on the desired performance of the resulting coating. In general, these coating compositions comprise up to about 30% by weight pigment, such as a carbon product. The amount of carbon product can be adjusted in order to optimize such properties as jetness, viscosity, and dispersion stability.

The coating compositions of the present invention can be used in a variety of different end-use applications, such as, for example, automotive topcoats, to give coatings with improved overall performance properties. The carbon products used in the coating compositions of the present invention have high t-areas which can be readily dispersed in coating compositions to obtain coatings with improved jetness and bluetone. This will be further clarified by the following examples, which are intended to be purely exemplary of the present invention.

EXAMPLES

The properties of the carbon blacks used and tested in the following examples are shown in Table 1 below. For each of these blacks, the BET surface area was measured following ASTM procedure D-3037, the t-area was measured following ASTM procedure D-5816, the DBPA was measured following ASTM procedure D-2414, and the sulfur content was measured following ASTM procedure D-1619.

TABLE 1

| Carbon Product* | t-area ($m^2/g$) | BET ($m^2/g$) | DBPA (cc/100 g) | pH | Elemental Analysis** |
|---|---|---|---|---|---|
| CB-A | 364 | 367 | 86 | 8.4 | 1.85% S |
| CB-B | 408 | 603 | 87 | 2.7 | N.T. |
| ES90B | 323 | 326 | 103 | 7.7 | 1.27% S |
| M1400 | 368 | 560 | 90 | 2.2 | N.T. |
| FW200 | 257 | 460 | 150 | 1.5 | N.T. |
| Ultra 2 | 356 | 583 | 95 | 1.8 | N.T. |
| Ultra 3 | 348 | 583 | 95 | 2.6 | N.T. |

*ES90B is Emperor ® S-90B pigment black commercially available from Cabot Corporation
M1400 is Monarch ® 1400 carbon black commercially available from Cabot Corporation
FW200 is Color Black FW200 commercially available from Degussa-Huls Corporation
Ultra 2 and Ultra 3 are Raven ® 5000 Ultra II and Ultra III carbon blacks commercially available from Columbian Chemical Company
**Elemental analysis is used to measure the amount of attached groups on the carbon product (N.T. = not a treated product).

Preparation of Carbon Black Products CB-A and CB-B

CB-B was prepared using the carbon black production process and apparatus described in U.S. Pat. No. 3,922,335, which is fully incorporated herein by reference. The apparatus of the general type shown in U.S. Pat. No. 3,922,335 is schematically depicted in FIG. 1 of the present invention and was used with the following modifications. The volume of combustion zone 1 was 2 $ft^3$. The length of feedstock injection zone 3 (L3) was 9 inches with an internal diameter (D2) of 4.2 inches. Six 0.016 inch diameter orifices were transversely oriented and spaced equiangularly in a single plane about the circumference of zone 3. These were located about 4.5 inches upstream from discharge end of zone 3. The reaction zone 4 was a heat insulated cylindrical tunnel having a length of 4 ft and an internal diameter (D3) of 6 inches. The natural gas was charged at a rate of 11.2 KSCFH and the oxidant air was charged at a rate of 97.5 KSCFH, both into the combustion zone 1. The oxidant air contained 27% oxygen and was heated to about 1000° F. prior to entry into the combustion zone 1. The combustion product gas velocity through zone 3 was determined to be about Mach 0.9 at the plane of the orifices (the term "Mach" refers to the numerical quotient obtained by dividing the actual velocity by the velocity of sound). The liquid feedstock was preheated to about 350° F. and was injected through the orifices at a total rate of about 68 U.S. gallons per hour under a supply pressure of about 500 p.s.i.g.

Under these conditions, a carbon black product was collected at a rate of about 170 lbs/hr. The overall percent combustion in the process was determined to be about 60%. The properties of the resulting carbon black product CB-B are shown in Table 1 above.

Carbon black product CB-A is a modified carbon black having attached —$C_6H_4SO_3Na$ groups. CB-A was prepared from carbon black product CB-B using the general methods described in U.S. Pat. Nos. 5,554,739, 5,851,280, 6,042,643, 5,707,432, and 5,837,045, which are fully incorporated herein by reference. The properties of the resulting carbon black product CB-A are shown in Table 1 above.

Examples 1 and 2

The following general procedure was followed for preparing coating compositions.

A millbase was prepared by premixing 65 g of DisperByk 161 (30%) (a block copolymer dispersant commercially available from BYK-Chemie) in 29.1 g of butyl acetate in a high speed DisperMat mixer with good agitation. To the millbase was added 20 g of the desired carbon product, CB-A or CB-B, at 2000 rpm for 2 minutes. Finally, 80 g of Setalux 27-1597 (80%) (a high solids acrylic available from Akzo Nobel) was added to this mixture at 4000 rpm for 10 minutes. The mixture was then recirculated through an Eiger mill at 10.8 m/s tip speed for 20 minutes at room temperature using zirconium silicate beads (0.6–0.8 mm).

A paint formulation containing this millbase was prepared by mixing all of the millbase with 580 g of Setalux 27-1597 and 220 g of Cymel 202 (an amide resin commercially available from Cytec Industries) in a container with good agitation. The viscosity was adjusted using Aromatic 100 (available from Shell) in order to obtain a 30 second flow through a #4 Ford cup.

A base coat was prepared by spraying this paint formulation on cold roll steel, flash drying at room temperature for 20 minutes, and force drying at 300° F. for 20 minutes. Properties of the coating were measured and are shown in Table 2 below.

A base coat/clear coat was also prepared by spraying this paint formulation on cold roll steel and flash drying at room temperature for 10 minutes. An acrylic clear coat was then sprayed onto this base coat, air dried at room temperature for another 20 minutes, and finally force dried at 300° F. for 20 minutes. Properties of this base coat/clear coat were measured and are shown in Table 3 below.

Comparative Examples 1–5

The procedure used for preparing the coating compositions of Examples 1 and 2 was also followed for preparing Comparative Examples 1–5, using the carbon products of Table 1. The results are also shown in Table 2 and Table 3 below.

TABLE 2

| Example # | Ex. 1 | Ex. 2 | Comp. 1 | Comp. 2 | Comp. 3 | Comp. 4 | Comp. 5 |
|---|---|---|---|---|---|---|---|
| Carbon Product | CB-A | CB-B | ES90B | M1400 | FW200 | Ultra II | Ultra III |
| DFT (mils)* | 1 | 1 | 1 | 1 | 1 | 1 | 1 |
| L | 0.93 | 1.26 | 0.97 | 1.24 | 1.51 | 1.20 | 1.28 |
| a | −0.26 | −0.20 | −0.26 | −0.19 | −0.23 | −0.25 | −0.22 |
| b | −0.15 | −0.06 | −0.10 | −0.25 | −0.10 | −0.16 | −0.19 |
| Mc | 306 | 288 | 302 | 293 | 281 | 293 | 290 |
| Gloss (20 deg) | 86 | 86 | 86 | 86 | 86 | 83 | 86 |
| Gloss (60 deg) | 92 | 92 | 92 | 92 | 92 | 91 | 92 |

*film thicknesses are approximate

A Hunter Color Meter was used to measure L (jetness), a (red tone), and b (bluetone) values. A lower L value means a greater level of jetness while the more negative a value for b, the better the bluetone. Mc is the color-dependent black value which can be calculated from L, a, and b. A higher Mc value also indicates a greater level of jetness.

TABLE 3

| Example # | Ex. 1 | Ex. 2 | Comp. 1 | Comp. 2 | Comp. 3 | Comp. 4 | Comp. 5 |
|---|---|---|---|---|---|---|---|
| Carbon Product | CB-A | CB-B | ES90B | M1400 | FW200 | Ultra II | Ultra III |
| Base Coat DFT (mils)* | 0.7 | 0.7 | 0.7 | 0.7 | 0.7 | 0.7 | 0.7 |
| Base/Clear Coat DFT (mils)* | 1.5 | 1.5 | 1.5 | 1.5 | 1.5 | 1.5 | 1.5 |
| L | 0.45 | 0.67 | 0.52 | 0.69 | 1.16 | 0.54 | 0.73 |
| a | −0.27 | −0.19 | −0.24 | −0.39 | −0.42 | −0.17 | −0.38 |
| b | −0.12 | −0.01 | −0.19 | −0.17 | 0.19 | −0.26 | −0.03 |
| Mc | 343 | 316 | 337 | 324 | 289 | 336 | 316 |
| Gloss (20 deg) | 90 | 90 | 90 | 90 | 90 | 90 | 91 |
| Gloss (60 deg) | 95 | 95 | 95 | 95 | 95 | 95 | 95 |

*film thicknesses are approximate

As can be seen from the results set forth in Table 2 and Table 3 above, coatings containing a high t-area black gave results that are comparable to coatings containing lower t-area blacks. For example, the coating of Example 1 gave similar L, a, b, Mc, and gloss values as Comparative Example 1, and Example 2 gave similar results to Comparative Examples 2–5.

It is important to note that, in the examples above, the level of dispersant was not optimized. Formulators typically calculate the dispersion requirement of a pigment based on its surface area (such as its t-area). In Examples 1 and 2, the level of dispersant used for CB-A and CB-B was the same as in Comparative Examples 1–5. However, one skilled in the art would recognize that more dispersant would be required for these high t-area blacks compared with those of the comparative examples in order to reach the same dispersant requirement. Table 4 below shows the active levels of dispersant used based on the black's surface area. Compared to FW-200, it can be seen that less dispersant per square meter was used in Examples 1 and 2 than in Comparative Example 3. Thus, additional dispersant is needed in Examples 1 and 2 in order to reach the desired level used in Comparative Example 3. The additional dispersant required, along with the resulting total dispersant levels needed in order to attain the same dispersant level as FW-200, are also shown in Table 4.

TABLE 4

| Example # | Ex. 1 | Ex. 2 | Comp. 1 | Comp. 2 | Comp. 3 | Comp. 4 | Comp. 5 |
|---|---|---|---|---|---|---|---|
| Carbon Product | CB-A | CB-B | ES90B | M1400 | FW200 | Ultra II | Ultra III |
| Amt of Carbon Product (g) | 20 | 20 | 20 | 20 | 20 | 20 | 20 |

TABLE 4-continued

| Example # | Ex. 1 | Ex. 2 | Comp. 1 | Comp. 2 | Comp. 3 | Comp. 4 | Comp. 5 |
|---|---|---|---|---|---|---|---|
| Amt of Dispersant Total (g) | 65 | 65 | 65 | 65 | 65 | 65 | 65 |
| Amt of Dispersant Active (g) * | 19.5 | 19.5 | 19.5 | 19.5 | 19.5 | 19.5 | 19.5 |
| Dispersant Distribution (mg/m$^2$) ** | 2.68 | 2.39 | 3.02 | 2.65 | 3.79 | 2.74 | 2.80 |
| Additional Dispersant (mg/m$^2$) | 1.11 | 1.40 | 0.77 | 1.14 | 0 | 1.05 | 0.99 |
| Actual Active Dispersant Required (g) | 27.6 | 31.0 | 24.5 | 27.9 | 19.5 | 27.0 | 26.4 |
| Actual Total Dispersant Required (g) | 92.0 | 103.3 | 81.7 | 93.0 | 65.0 | 90.0 | 88.0 |

\* Dispersant contains 30% by weight active ingredient
\*\* Calculated as the amount of active dispersant per g of carbon product divided by the t-area It is understood that if these levels of dispersant were used to prepare coatings as described above (that is, if the level of dispersant were optimized for the specific carbon blacks used), the coatings containing the high t-area blacks would be shown to have improved jetness and stronger blue undertone. It is expected that the resulting Mc values for Examples 1 and 2 would be increased by at least 10 units or more, thereby resulting in a coating composition with enhanced jetness.

As a result, coating compositions containing the carbon products described herein have been found to provide high color performance and good mechanical and application properties in a variety of coating applications.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What we claim is:

1. A coating composition comprising a liquid vehicle and a carbon product having a t-area greater than or equal to 400 m$^2$/g.

2. The coating composition of claim 1, wherein the liquid vehicle is an aqueous vehicle.

3. The coating composition of claim 1, wherein the liquid vehicle is a non-aqueous vehicle.

4. The coating composition of claim 1, wherein the carbon product is carbon black.

5. The coating composition of claim 1, wherein the carbon product has a t-area between 400 m$^2$/g and 600 m$^2$/g.

6. The coating composition of claim 5, wherein the carbon product has a t-area between 400 m$^2$/g and 500 m$^2$/g.

7. The coating composition of claim 1, wherein the carbon product further has a DBPA of 60–150 cc/100 g.

8. The coating composition of claim 7, wherein the carbon product further has a DBPA of 80–120 cc/100 g.

9. The coating composition of claim 1, wherein the carbon product is an oxidized carbon black.

10. A coating composition comprising a liquid vehicle and a modified carbon product having a t-area greater than or equal to 350 m$^2$/g, wherein the modified carbon product comprises a carbon product having attached at least one organic group.

11. The coating composition of claim 10, wherein the liquid vehicle is an aqueous vehicle.

12. The coating composition of claim 10, wherein the liquid vehicle is a non-aqueous liquid vehicle.

13. The coating composition of claim 10, wherein the carbon product is carbon black.

14. The coating composition of claim 10, wherein the carbon product has a t-area between 350 m$^2$/g and 600 m$^2$/g.

15. The coating composition of claim 14, wherein the carbon product has a t-area between 350 m$^2$/g and 500 m$^2$/g.

16. The coating composition of claim 10, wherein the carbon product further has a DBPA of 60–150 cc/100 g.

17. The coating composition of claim 16, wherein the carbon product further has a DBPA of 80–120 cc/100 g.

18. The coating composition of claim 10, wherein the carbon product is an oxidized carbon black.

19. The coating composition of claim 10, wherein the organic group comprises at least one ionic group, at least one ionizable group, or a mixture of at least one ionic or at least one ionizable group.

20. The coating composition of claim 10, wherein the organic group comprises at least one sulfonate or at least one carboxylate group.

21. The coating composition of claim 10, wherein the organic group is a sulfophenyl group.

22. The coating composition of claim 10, wherein the organic group is present in an amount of from about 0.1 to 5.0 micromoles/m$^2$ of the carbon product used based on said t-area of the carbon product.

23. The coating composition of claim 22, wherein the organic group is present in an amount of from about 0.1 to 2.7 micromoles/m$^2$ of the carbon product used based on said t-area of the carbon product.

* * * * *